United States Patent
Huang et al.

(10) Patent No.: US 10,013,374 B2
(45) Date of Patent: Jul. 3, 2018

(54) BIDIRECTIONAL COMMUNICATION METHOD BETWEEN A MASTER TERMINAL AND A SLAVE TERMINAL ON A SINGLE TRANSMISSION LINE

(71) Applicant: RichWave Technology Corp., Taipei (TW)

(72) Inventors: Ching-Shou Huang, Taipei (TW); Tian-Tsai Chang, Taipei (TW); Tzu-Pai Wang, Taipei (TW); Zhuo Fu, Taipei (TW)

(73) Assignee: RichWave Technology Corp., Taipei (TW)

( * ) Notice: Subject to any disclaimer, the term of this patent is extended or adjusted under 35 U.S.C. 154(b) by 129 days.

(21) Appl. No.: 15/007,214

(22) Filed: Jan. 27, 2016

(65) Prior Publication Data
US 2016/0224488 A1 Aug. 4, 2016

(30) Foreign Application Priority Data

Jan. 30, 2015 (TW) .............................. 104103277 A
Aug. 6, 2015 (TW) .............................. 104125541 A

(51) Int. Cl.
G06F 13/00 (2006.01)
G06F 13/362 (2006.01)
G06F 13/40 (2006.01)

(52) U.S. Cl.
CPC ........ G06F 13/362 (2013.01); G06F 13/4068 (2013.01)

(58) Field of Classification Search
CPC ........................... G06F 13/362; G06F 13/4068

USPC ......................................................... 710/110
See application file for complete search history.

(56) References Cited

U.S. PATENT DOCUMENTS

| 7,111,097 B2 | 9/2006 | Lin | |
| 7,191,267 B2 * | 3/2007 | Noda | H04N 7/163 348/E7.061 |
| 7,702,822 B2 * | 4/2010 | Barrenscheen | H04L 12/403 710/110 |

(Continued)

FOREIGN PATENT DOCUMENTS

| CN | 1321021 A | 11/2001 |
| CN | 101464724 A | 6/2009 |

(Continued)

OTHER PUBLICATIONS

Ma Qing-gong et al., "The multi-machine communication system based on RS485", Jan. 2012, p. 132-133, Electronics World.

*Primary Examiner* — Idriss N Alrobaye
*Assistant Examiner* — Brooke J Taylor
(74) *Attorney, Agent, or Firm* — Winston Hsu

(57) ABSTRACT

A bidirectional communication method between a master terminal and a slave terminal on a single transmission line includes the master terminal transmitting an initial message, a slave number and a master acknowledgement signal. After acknowledgement of the slave terminal, the master terminal transmits an address of the slave terminal and a master acknowledgement signal. After acknowledgement of the slave terminal, the master terminal transmits data and a master acknowledgement signal. After acknowledgement of the slave terminal, the master terminal transmits a master No-acknowledgement signal. And the slave terminal transmits a slave acknowledgement signal.

31 Claims, 13 Drawing Sheets

(56) References Cited

U.S. PATENT DOCUMENTS

| | | | |
|---|---|---|---|
| 2006/0117118 A1 | 6/2006 | Barrenscheen | |
| 2009/0300247 A1* | 12/2009 | Kung | G06F 13/4286 |
| | | | 710/110 |
| 2013/0019039 A1 | 1/2013 | Herklots | |
| 2014/0108829 A1* | 4/2014 | Tai | G06F 1/266 |
| | | | 713/300 |
| 2014/0310436 A1* | 10/2014 | Du | G06F 13/362 |
| | | | 710/110 |

FOREIGN PATENT DOCUMENTS

| | | |
|---|---|---|
| CN | 201374120 Y | 12/2009 |
| CN | 102929820 A | 2/2013 |
| CN | 202929610 U | 5/2013 |
| CN | 104111906 A | 10/2014 |
| TW | 200818720 | 4/2008 |
| TW | 200947958 | 11/2009 |
| TW | 200949547 | 12/2009 |

\* cited by examiner

BIDIRECTIONAL COMMUNICATION METHOD BETWEEN A MASTER TERMINAL AND A SLAVE TERMINAL ON A SINGLE TRANSMISSION LINE

CROSS REFERENCE TO RELATED APPLICATION

This application claims priority of Taiwan application No. 104125541 and priority of Taiwan application No. 104103277, which were respectively filed on Aug. 6, 2015 and Jan. 30, 2015, and are included herein by reference.

TECHNICAL FIELD

This invention is related to a bidirectional communication method between a master terminal and a slave terminal on a single transmission line, and more particularly, a bidirectional communication method that can apply to a master terminal and a plurality of slave terminals on a single transmission line.

BACKGROUND

Previously, the communication between a micro-controller and other elements are usually based on an internal integrated circuit ($I^2C$). The internal integrated circuit mainly uses a data transmission line for transmitting a data signal and a clock transmission line for transmitting a clock signal so that each of the bit data contained in the data signal can be identified correctly. However, under the condition of limited area in electronic devices, the communication between different elements by using two transmission lines may not only increase the difficulty of routing between elements, but also increase the number of pins of each element, which produces unnecessary cost and complexity.

To avoid adding unnecessary routing and pins when using the internal integrated circuit, one-wire protocol became a possible solution. Namely, according to the rules set by the one-wire protocol, communications between different elements can be achieved on one single transmission line. However, most of the prior art are used for communication between one master element and one slave element, and only few of the prior art can support the communication between one master element and a plurality of slave elements so the operations are rather inflexible. For example, to communicate with several slave elements, the master element may require several transmission lines each connected to the slave elements respectively. Therefore, the one-wire protocol of the prior art could hardly reduce the complexity of the routing between elements, and could hardly reduce the number of pins of the master element effectively.

SUMMARY

One embodiment of the present invention discloses a bidirectional communication method between a master terminal and a slave terminal on a transmission line. The method comprises the master terminal transmitting an initial message, a slave number of the slave terminal and a first master acknowledgement signal through the transmission line. The slave terminal is operated under a first mode and transmits a first slave acknowledgement signal through the transmission line after the slave terminal receives the initial message, the slave number and the first master acknowledgement signal. The master terminal transmits an address of the slave terminal and a second master acknowledgement signal through the transmission line after the master terminal receives the first slave acknowledgement signal. The slave terminal transmits a second slave acknowledgement signal through the transmission line after the slave terminal receives the address and the second master acknowledgement signal. The master terminal transmits data and a first master no-acknowledgement signal through the transmission line after the master terminal receives the second slave acknowledgement signal. The slave terminal transmits a third slave acknowledgement signal through the transmission line after the slave terminal receives the data and the first master no-acknowledgement signal.

Each of the master acknowledgement signals is changing from a first voltage level to a second voltage level and then changing from the second voltage level to the first voltage level, and the first master no-acknowledgement signal is changing from the first voltage level to the second voltage level and then changing from the second voltage level to the first voltage level.

A first ratio of a time each of the master acknowledgement signals sustains in the second voltage level to a time each of the master acknowledgement signals sustains in the first voltage level is greater than an upper threshold and a second ratio of a time the first master no-acknowledgement signal sustains in the second voltage level to a time the first master no-acknowledgement signal sustains in the first voltage level is smaller than a lower threshold. Or the first ratio is smaller than the lower threshold and the second ratio is greater than the upper threshold. The upper threshold is greater than or equal to the lower threshold.

Another embodiment of the present invention discloses a bidirectional communication method between a master terminal and a slave terminal on a transmission line. The method comprises the master terminal transmitting a first initial message, a slave number of the slave terminal, a writing bit, and a first master acknowledgement signal through the transmission line. The slave terminal transmits a first slave acknowledgement signal through the transmission line after the slave terminal receives the first initial message, the slave number, the writing bit and the first master acknowledgement signal. The master terminal transmits an address of the slave terminal and a first master no-acknowledgement signal through the transmission line after the master terminal receives the first slave acknowledgement signal. The slave terminal transmits a second slave acknowledgement signal through the transmission line after the slave terminal receives the address and the first master no-acknowledgement signal. The master terminal transmits a second initial message, the slave number, a reading bit, and a second master acknowledgement signal through the transmission line after the master terminal receives the second slave acknowledgement signal. The slave terminal transmits a third slave acknowledgement signal and data stored in the address after the slave terminal receives the second initial message, the slave number, the reading bit, and the second master acknowledgement signal. The master terminal transmits a second master no-acknowledgement signal through the transmission line after the master terminal receives the third slave acknowledgement signal and after the master terminal receives the data stored in the address, and The slave terminal transmits a fourth slave acknowledgement signal after the slave terminal receives the second master no-acknowledgement signal.

Each of the master acknowledgement signals is changing from a first voltage level to a second voltage level and then changing from the second voltage level to the first voltage level, and each of the master no-acknowledgement signals is changing from the first voltage level to the second voltage level and then changing from the second voltage level to the first voltage level.

A first ratio of a time each of the master acknowledgement signals sustains in the second voltage level to a time each of the master acknowledgement signals sustains in the first voltage level is greater than an upper threshold and a second ratio of a time each of the master no-acknowledgement signals sustains in the second voltage level to a time each of the master no-acknowledgement signals sustains in the first voltage level is smaller than a lower threshold. Or the first ratio is smaller than the lower threshold and the second ratio is greater than the upper threshold. The upper threshold is greater than or equal to the lower threshold.

Another embodiment of the present invention discloses a bidirectional communication method between a master terminal and a slave terminal on a transmission line. The method comprises the master terminal transmitting an initial message, a slave number of the slave terminal, a reading bit, and a first master acknowledgement signal through the transmission line. The slave terminal transmits a first slave acknowledgement signal through the transmission line after the slave terminal receives the initial message, the slave number and the first master acknowledgement signal. The master terminal transmits an address of the slave terminal and a second master acknowledgement signal through the transmission line after the master terminal receives the first slave acknowledgement signal. The slave terminal transmits a second slave acknowledgement signal and data stored in the address through the transmission line after the slave terminal receives the address and the second master acknowledgement signal. The master terminal transmits a master no-acknowledgement signal through the transmission line after the master terminal receives the second slave acknowledgement signal and after the master terminal receives the data stored in the address. The slave terminal transmits a third slave acknowledgement signal through the transmission line after the slave terminal receives the master no-acknowledgement signal.

Each of the master acknowledgement signals is changing from a first voltage level to a second voltage level and then changing from the second voltage level to the first voltage level, and the master no-acknowledgement signal is changing from the first voltage level to the second voltage level and then changing from the second voltage level to the first voltage level.

A first ratio of a time each of the master acknowledgement signals sustains in the second voltage level to a time each of the master acknowledgement signals sustains in the first voltage level is greater than an upper threshold and a second ratio of a time the master no-acknowledgement signal sustains in the second voltage level to a time the master no-acknowledgement signal sustains in the first voltage level is smaller than a lower threshold. Or the first ratio is smaller than the lower threshold and the second ratio is greater than the upper threshold. The upper threshold is greater than or equal to the lower threshold.

DETAILED DESCRIPTION

Figure 1:
FIG. 1 shows a flow chart of a communication method according to one embodiment of the present invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 13:
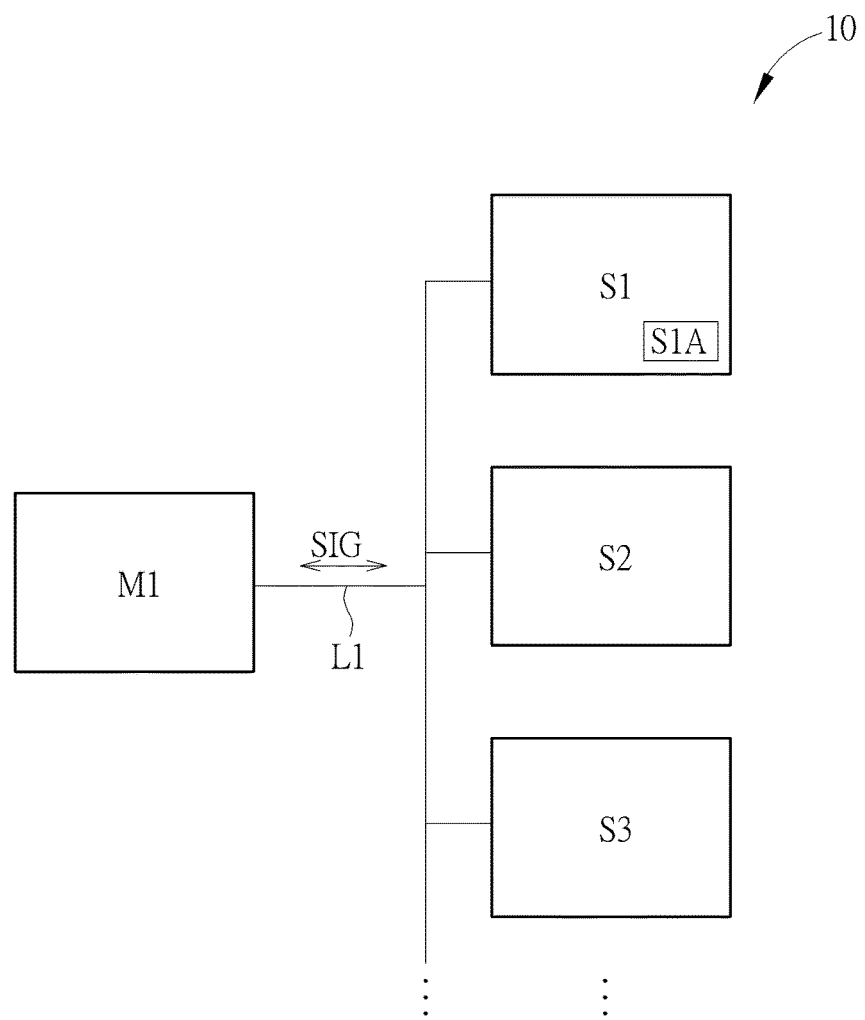
FIG. 13 shows a bidirectional communication system according to one embodiment of the present invention.

FIG. 13 shows a bidirectional communication system 10 with one single transmission line. The bidirectional communication system 10 includes a master terminal M1 and a plurality of slave terminals S1, S2, and S3. The master terminal M1 can connect with the plurality of slave terminals S1, S2, and S3 through the transmission line L1. That is, whenever the master terminal M1 transmits a signal SIG through the transmission line L1, each of the slave terminals S1, S2, and S3 can receive the signal SIG from the transmission line L1, or whenever any slave terminal among the slave terminals S1, S2, and S3 transmits the signal SIG through the transmission line, the master terminal M1 can receive the signal SIG from the transmission line L1. In some embodiments of the present invention, the master terminal M1 can be a micro controller or a control circuit that can perform write operations or read operations to the slave terminals S1, S2, and S3. Although the bidirectional communication system 10 includes the slave terminal S1, S2, and S3, in other embodiments of the present invention, the bidirectional communication system 10 can also include only one the slave terminal S1 or any other number of slave terminals.

Figure 2:
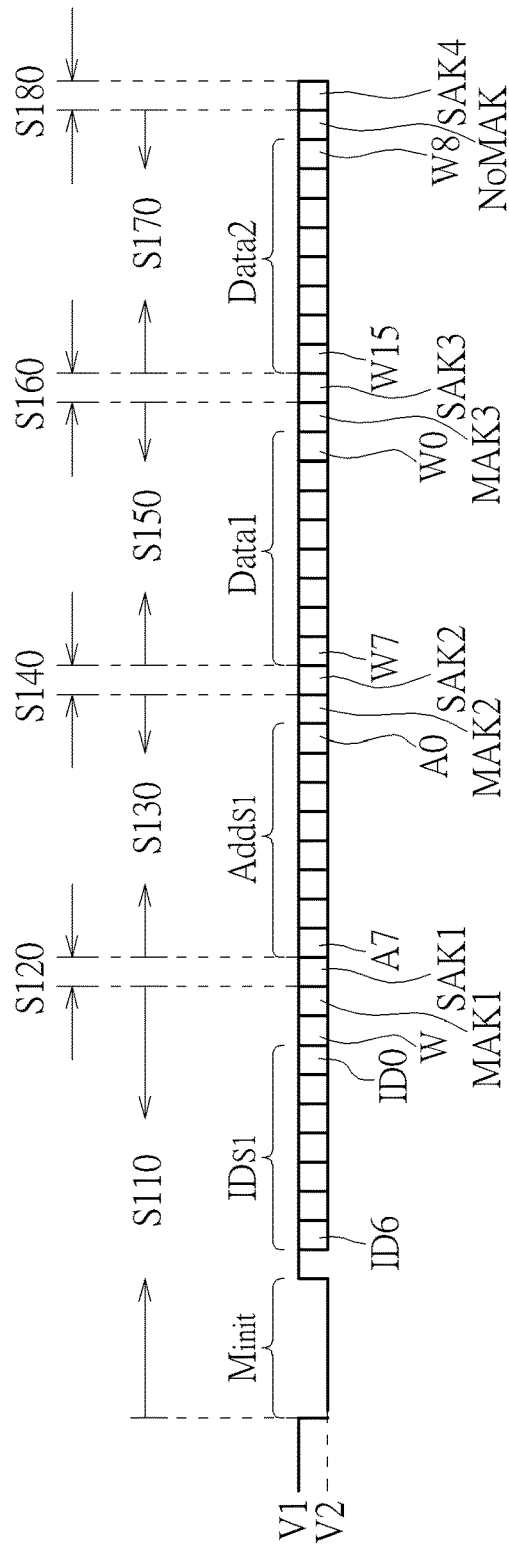
FIG. 2 shows a timing diagram of the method in FIG. 1.

FIG. 1 shows a flow chart of a bidirectional communication method 100 applied between the master terminal M1 and the slave terminal S1 according to one embodiment of the present invention. According to method 100, the bidirectional communication system 10 can allow the master terminal M1 to perform a write operation to the slave terminal S1 through the single transmission line L1. FIG. 2 shows a timing diagram of signals on the transmission line L1 according to method 100, namely, FIG. 2 can help to explain the timing of the signals transmitted by the master terminal M1 or the slave terminal S1 on the transmission line L1 in each steps of method 100. In some embodiments of the present invention, when the master terminal M1 and the slave terminal are not transmitting any signals through the transmission line L1, a voltage level of the transmission line L1 will be kept at a first voltage level V1.

Method 100 in FIG. 1 includes the steps S110 to S180.

In step S110, the master terminal M1 can transmit an initial message $M_{init}$, a slave number $ID_{S1}$ of the slave terminal S1 and a master acknowledgement signal MAK1 through the transmission line L1. When the master terminal M1 wants to communicate with the slave terminal S1, the master terminal M1 can transmit the initial message $M_{init}$ through the transmission line L1 firstly so that each of the slave terminals S1, S2, and S3 connected to the transmission line L1 can prepare for receiving the following signals. Since there may be more than one slave terminal on the transmission line L1, the master terminal M1 can successively transmit the slave number $ID_{S1}$ of the slave terminal S1 so each of the slave terminals S1, S2, and S3 can identify which slave terminal the master terminal M1 wants to communicate with according to the slave number. When the slave number transmitted by the master terminal M1 is the slave number $ID_{S1}$ of the slave terminal S1, it means that the master terminal M1 is about to perform operations to the slave terminal S1 so the other slave terminal S2 and S3 can ignore the following signals. Since the transmission line L1 does not transmit clock signals, the master terminal M1 can transmit the master acknowledge signal MAK1 after transmitting the slave number $ID_{S1}$ to distinguish the last bit information of the slave number $ID_{S1}$.

In some embodiments of the present invention, each of the data can be sent by the master terminal M1 with a unit of eight bits. However, in other embodiments, each of the data can be sent with different lengths or with units of other number of bits. In FIG. 2, the slave number $ID_{S1}$ of the slave terminal S1 can include 7 bits, and the master terminal M1 can send the slave number $ID_{S1}$ from the most significant bit ID6 of the slave number $ID_{S1}$ to the least significant bit ID0 of the slave number $ID_{S1}$. However, this is not to limit the present invention. In other embodiments, the master terminal M1 can also transmit the slave number $ID_{S1}$ according to other orders. After the master terminal M1 transmits the slave number $ID_{S1}$, the master terminal M1 can also transmit a writing bit W and then transmit the master acknowledgement signal MAK1. The writing bit can be, for example but not limited to, 0. The writing bit can notify the slave terminal S1 that the master terminal M1 is about to perform a write operation and the slave terminal S1 can response accordingly in the following steps. In some embodiments, the master terminal M1 can also transmit the writing bit W firstly, then the slave number $ID_{S1}$, and then the master acknowledgement signal MAK1 successively or in another permutation of the signals.

In step S120, after the slave terminal that has the slave number $ID_{S1}$ receives the initial message $M_{init}$, the slave number $ID_{S1}$ and the master acknowledgement signal MAK1, the slave terminal S1 may transmit a slave acknowledgement signal SAK1 through the transmission line L1 for notifying the master terminal M1 to move on with the following communication.

In Step S130, after the master terminal M1 receives the slave acknowledgement signal SAK1, the master terminal M1 can transmit an address $Add_{S1}$ of the slave terminal S1 and a master acknowledgement signal MAK2 through the transmission line L1.

After the slave terminal S1 receives the address $Add_{S1}$ and the master acknowledgement signal MAK2, the slave terminal S1 can transmit a slave acknowledgement signal SAK2 through the transmission line L1 in step S140. In some embodiments of the present invention, the address $Add_{S1}$ can include eight bits, and the master terminal M1 can send the most significant bit A7 of the address $Add_{S1}$ to the least significant bit A0 of the address $Add_{S1}$ successively. However, this is not to limit the present invention, in other embodiments, the master terminal M1 can also transmit each bit of the address $Add_{S1}$ with different orders.

In step S150, after the master terminal M1 receives the slave acknowledgement signal SAK2, the master terminal M1 can transmit data Data1 and a master acknowledgement signal MAK3 through the transmission line L1.

In step S160, after the slave terminal S1 receives the data Data1 and the master acknowledgement signal MAK3, the slave terminal S1 can transmit a slave acknowledgement signal SAK3 through the transmission line L1. In some embodiments, the master terminal M1 can transmit the data Data1 from the most significant bit W7 of the data Data1 to the least significant bit W0 of the data Data1 successively. However, this is not to limit the present invention, in other embodiments, the master terminal M1 can also transmit each bit of the data Data1 with other orders.

In some embodiments, the data Data1 can include 8 bits of data, and the memory corresponding to the address $Add_{S1}$ of the slave terminal S1 can store 16 bits of data. Therefore, in step S170, after the master terminal M1 receives the slave acknowledgement signal SAK3, the master terminal M1 can transmit data Data2 and a master no-acknowledgement signal NoMAK through the transmission line L1. In some embodiments, the slave terminal can store the data Data1 received in step S160 to a buffer memory firstly. After receiving the data Data2 in step S180, the slave terminal S1 can further store the 8 bits of information W15 to W8 in Data2 and the 8 bits of information W7 to W0 in Data1 to the corresponding memory at once.

In other embodiments, the memory corresponding to the address $Add_{S1}$ of the slave terminal S1 can only store 8 bits of data. In this case, when the slave terminal S1 receives the data Data2 transmitted from the master terminal M1, the writing address can be updated. For example, the address can be updated by incrementing the address $Add_{S1}$ with a predetermined value, so the data Data2 will be stored in the memory corresponding to the updated address. Consequently, a burst write function can be achieved.

In step S180, after the slave terminal S1 receives the data Data2 and the master no-acknowledgement signal NoMAK, the slave terminal S1 can transmit a slave acknowledgement signal SAK4 through the transmission line L1, and the write operation of the master terminal M1 to the slave terminal S1 is also completed.

In some embodiments of the present invention, if the master terminal M1 only wants to write the data Data1 and does not want to write the data Data2, then the steps S160 and S170 can be skipped; meanwhile, in step S150, after the master terminal M1 transmits the data Data1, instead of transmitting the master acknowledgement signal MAK3, the master terminal M1 can transmit the master no-acknowledgement signal NoMAK so the write operation of the master terminal M1 to the slave terminal S1 is completed.

In some embodiments, after the master terminal M1 transmits the master acknowledgement signal, if the master terminal M1 does not receive any slave acknowledgement signals from the slave terminal S1 within a predetermined time, then the communication may be abnormal. In this case, the master terminal M1 can execute an interrupt instruction of the system in a first place. However, if after the terminal M1 transmits the master acknowledgement signal, the master terminal M1 can receive the slave acknowledgement signal from the slave terminal S1 within the predetermined time, then the communication should be normal and the master terminal M1 can move on with the following operations of the present communication.

Figure 3:
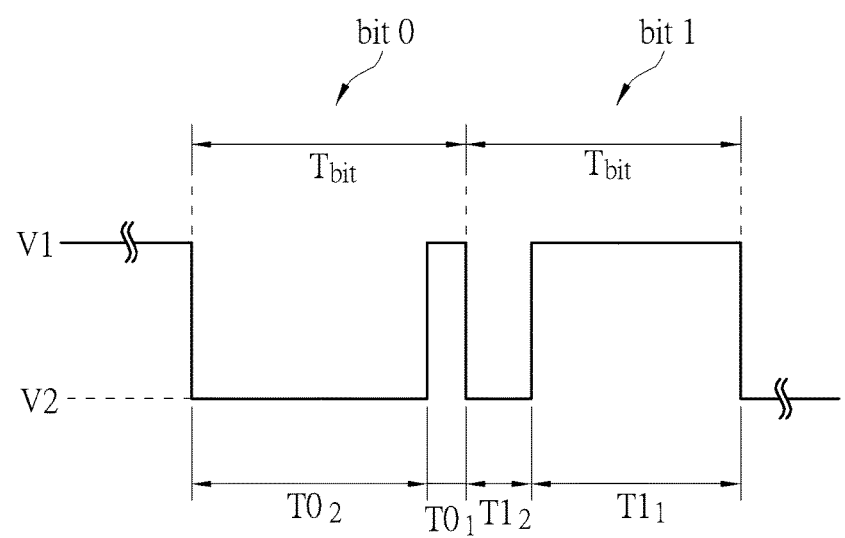
FIG. 3 shows waveforms of bit data according to one embodiment of the present invention.

FIG. 3 shows waveforms of a first type bit data and a second type bit data on the transmission line L1 according to one embodiment of the present invention. Although the first type bit data and the second type bit data shown in FIG. 3 represent bit 1 and bit 0 respectively, the first type bit data and the second type bit data may represent bit 0 and bit 1 respectively in other embodiments of the present invention.

In FIG. 3, when the master terminal M1 or the slave terminal S1 transmits the first type bit data through the transmission line L1, the master terminal M1 or the slave terminal S1 can change the voltage level of the transmission line L1 from the first voltage level V1 to the second voltage level V2 and then change the voltage level of the transmission line L1 from the second voltage level V2 to the first voltage level V1, all within a transmission time $T_{bit}$ of one bit data. Also, a ratio of a time $T1_2$ the transmission line L1 sustains in the second voltage level V2 to a time $T1_1$ the transmission line L1 sustains in the first voltage level V1 is smaller than a lower threshold $R_{min}$. The lower threshold $R_{min}$ can be for example but not limited to 1 or 0.5. When the master terminal M1 or the slave terminal S1 transmits the second type bit data through the transmission line L1, the master terminal M1 or the slave terminal S1 can change the voltage level of the transmission line L1 from the first voltage level V1 to the second voltage level V2 and then change the voltage level of the transmission line L1 from the second voltage level V2 to the first voltage level V1, all within a transmission time $T_{bit}$ of one bit data. Also, a ratio of a time $T0_2$ the transmission line L1 sustains in the second voltage level V2 to a time $T0_1$ the transmission line L1 sustains in the first voltage level V1 is greater than an upper threshold $R_{max}$. The upper threshold $R_{max}$ can be for example but not limited to 1 or 2.

Consequently, according to the ratio of the time the transmission line L1 sustains in the second voltage level V2 to the time the transmission line sustains in the first voltage level V1, one can identify the type of the received data to be bit 0 or bit 1. In some embodiments, the master terminal M1 and the slave terminal S1 can adjust the transmission time of each of the bit data according to the time required by processing each of the bit data. For example, if the second bit data requires more time to complete its calculation, the master terminal M1 can extend the transmission time of the first bit data (the first bit data can be, for example, bit 1) which is transmitted before the second bit data. That is, the master terminal M1 can keep outputting the first bit data and the master terminal M1 can finally output the second bit data after the calculation of the second bit data is completed. As long as the ratio of the time the voltage level of the transmission line L1 sustains in the second voltage level V2 to the time the voltage level of the transmission line L1 sustains in the first voltage level V1 is smaller than the lower threshold $R_{min}$ during the transmission time of the first bit data, the slave terminal can still recognize that the first bit data is bit 1 correctly.

Consequently, no clock signal is required between the master terminal M1 and the slave terminal S1 for identifying each of the data information. Therefore, no extra transmission line for sending synchronizing clock signal is required, the complicated routing between elements can be avoided, and no extra hardware element is required by the master terminal or the slave terminal to synchronize the frequency of the data signal to the clock signal.

In some embodiments of the present invention, the master terminal M1 and the slave terminal S1 can further use a clock module to calculate the length of the time the voltage of the transmission line L1 sustains in the first voltage V1 and the second voltage V2. However, this is not to limit the present invention. In other embodiments, the master terminal M1 and the slave terminal S1 can also use other ways, such as integrators, to calculate the length of the time the voltage of the transmission line L1 sustains in the first voltage V1 and the second voltage V2.

In some embodiments, to avoid the master terminal M1 or the slave terminal S1 from mistaking the type of bit data, the lower threshold Rmin can be set to 0.5 and the upper limit can be set to 2. In this case, the time $T1_1$ should be two times longer than the time $T1_2$ when the master terminal M1 or the slave terminal S1 transmits the bit data bit 1, and the time $T0_2$ should be two times longer than the time $T0_1$ when the master terminal M1 or the slave terminal S1 transmits the bit data bit 0. In FIG. 3, the first voltage level V1 is higher than the second voltage level V2; however, in other embodiments of the preset invention, the first voltage level V1 can also be lower than the second voltage level V2.

Figure 4:
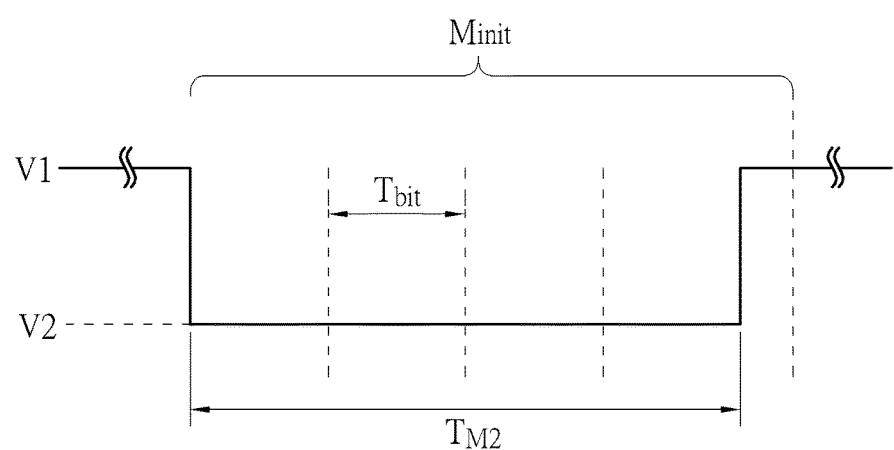
FIG. 4 shows a waveform of an initial message according to one embodiment of the present invention.

FIG. 4 shows the waveform of the initial message $M_{init}$ on the transmission line L1 according to one embodiment of the present invention. In FIG. 4, the initial message $M_{init}$ can change from the first voltage level V1 to the second voltage level V2 and then change from the second voltage level V2 to the first voltage level V1, and a time $T_{M2}$ the initial message $M_{init}$ sustains in the second voltage level V2 is longer than a transmission time $T_{bit}$ of one bit data. In some embodiments, to ensure the slave terminal S1 can receive the initial message $M_{init}$ correctly, the time $T_{M2}$ the initial message $M_{init}$ sustains in the second voltage level V2 can be longer than the transmission time of three bit data, $3T_{bit}$.

In some embodiments, the transmission time of each bit data can be an unfixed value within a predetermined range. For example, the transmission time $T_{bit}$ of each of the bit data can be within the range between the minimum transmission time (ex. 10 μs) and the maximum transmission time (ex. 100 μs). In this case, the time $T_{M2}$ the initial message $M_{init}$ sustains in the second voltage level V2 can be longer than the maximum transmission time of three bit data (ex. 300 μs).

Figure 5:
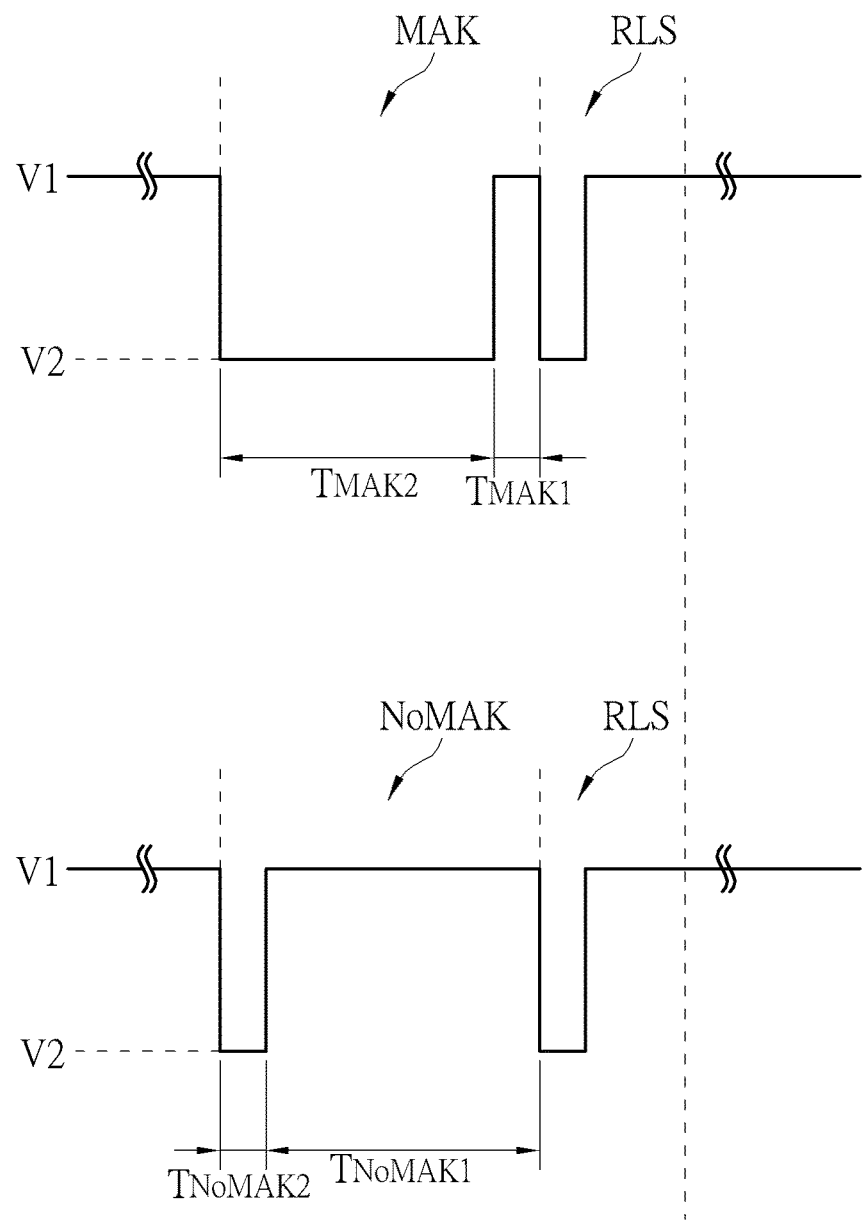
FIG. 5 shows waveforms of a master acknowledge signal, a master no-acknowledge signal and a release signal according to one embodiment of the present invention.

FIG. 5 shows waveforms of the master acknowledgement signal MAK and the master no-acknowledgement signal NoMAK on the transmission line L1 according to one embodiment of the present invention. The master acknowledgement signal MAK and the master no-acknowledgement signal NoMAK can change from the first voltage level V1 to the second voltage level V2 and then change from the second voltage level V2 to the first voltage level V1. In FIG. 5, a ratio of a time $T_{MAK2}$ the master acknowledgement signal MAK sustains in the second voltage level V2 to a time $T_{MAK1}$ the master acknowledgement signal MAK sustains in the first voltage level V1 is greater than the upper threshold $R_{max}$, and a ratio of a time $T_{NoMAK2}$ the master no-acknowledgement signal NoMAK sustains in the second voltage level V2 to a time $T_{NoMAK1}$ the master no-acknowledgement signal NoMAK sustains in the first voltage level V1 is smaller than the lower threshold $R_{min}$.

The slave terminal S1 can identify the received signal to be a master acknowledgement signal MAK or a master no-acknowledgement signal NoMAK according to the ratios of the time the voltage level of the transmission line L1 sustains in the second voltage level V2 to the time the voltage level of the transmission line L1 sustains in the first voltage level V1. However, if the master terminal M1 does not transmit any other signals after the master acknowledgement signal MAK or the master no-acknowledgement signal NoMAK, then after the master acknowledgement signal MAK or the master no-acknowledgement signal NoMAK changes from the second voltage level V2 to the first voltage level V1, the voltage level of the transmission line L1 will stay in the first voltage level V1 and the slave terminal S1 may mistake the master acknowledgement signal MAK for the master no-acknowledgement signal NoMAK.

To ensure that the slave terminal S1 can identify whether the master acknowledgement signals MAKs and the master no-acknowledgement signals NoMAKs are completed, in FIG. 5, after the master terminal M1 transmit the master acknowledgement signal MAK through the transmission line L1, the master terminal M1 can transmit a release signal RLS through the transmission line L1 successively, and after the master terminal M1 transmits the master no-acknowledgement signal NoMAK through the transmission line L1, the master terminal M1 can transmit the release signal RLS through the transmission line L1 successively. The release signal RLS can change from the first voltage level V1 to the second voltage level V2 and then changes from the second voltage level V2 to the first voltage level V1. Consequently, the slave terminal S1 can determine whether the master acknowledgement signal MAK and the master no-acknowledgement signal NoMAK has been transmitted completely without mistake.

Although in FIG. 5, the ratio of the time $T_{MAK2}$ the master acknowledgement signal MAK sustains in the second voltage level V2 to the time $T_{MAK1}$ the master acknowledgement signal MAK sustains in the first voltage level V1 is greater than the upper threshold $R_{max}$, and the ratio of the time $T_{NoMAK2}$ the master no-acknowledgement signal NoMAK sustains in the second voltage level V2 to the time $T_{NoMAK1}$ the master no-acknowledgement signal NoMAK sustains in the first voltage level V1 is smaller than the lower threshold $R_{min}$, in other embodiments, the ratio of the time $T_{MAK2}$ the master acknowledgement signal MAK sustains in the second voltage level V2 to the time $T_{MAK1}$ the master acknowledgement signal MAK sustains in the first voltage level V1 can also be smaller than the lower threshold $R_{min}$ with the ratio of the time $T_{NoMAK2}$ the master no-acknowledgement signal NoMAK sustains in the second voltage level V2 to the time $T_{NoMAK1}$ the master no-acknowledgement signal NoMAK sustains in the first voltage level V1 being greater than the upper threshold $R_{max}$.

Since the slave terminal S1 can identify the master acknowledgement signal MAK and the master no-acknowledgement signal NoMAK according to the ratio of the time the voltage level of the transmission line L1 sustains in the second voltage level V2 to the time the voltage level of the transmission line L1 sustains in the first voltage level V1, the master terminal M1 can adjust the transmission time of the master acknowledgement signal MAK and the master no-acknowledgement signal NoMAK according to the time required for processing the signals. Therefore, the master terminal M1 and the slave terminal S1 do not require other synchronizing signals to identify the master acknowledgement signal MAK or the master no-acknowledgement signal NoMAK, and thus no extra transmission line for transmitting the clock signal which may cause the complexity of routing between elements is needed, or no extra hardware elements to synchronize the frequencies of the signals transmitted by the master terminal and the slave terminal to the clock signals is required.

Figure 6:
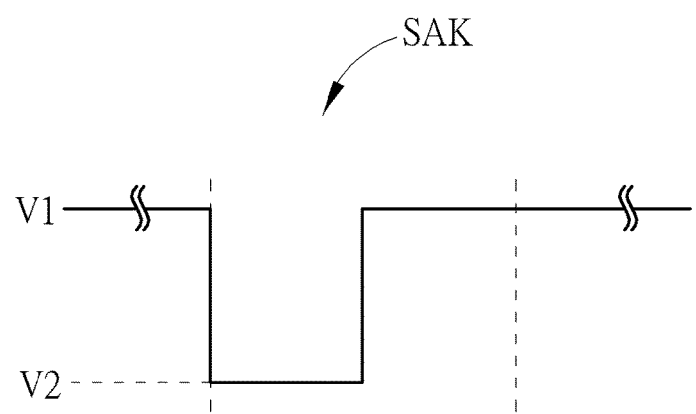
FIG. 6 shows a waveform of a slave acknowledge signal according to one embodiment of the present invention.

FIG. 6 shows a waveform of the slave acknowledgement signal SAK according to one embodiment of the present invention. The slave acknowledgement signal SAK can change from the first voltage level V1 to the second voltage level V2 and then change from the second voltage level V2 to the first voltage level V1.

According to method 100, the master terminal M1 and the slave terminal S1 can communicate to each other on the single transmission line L1, and the transmission line L1 can connect to the plurality of slave terminals S1, S2, and S3 so the complexity of routing between elements and the requirement of the number of pins for the master terminal M1 can be reduced.

Figure 7:
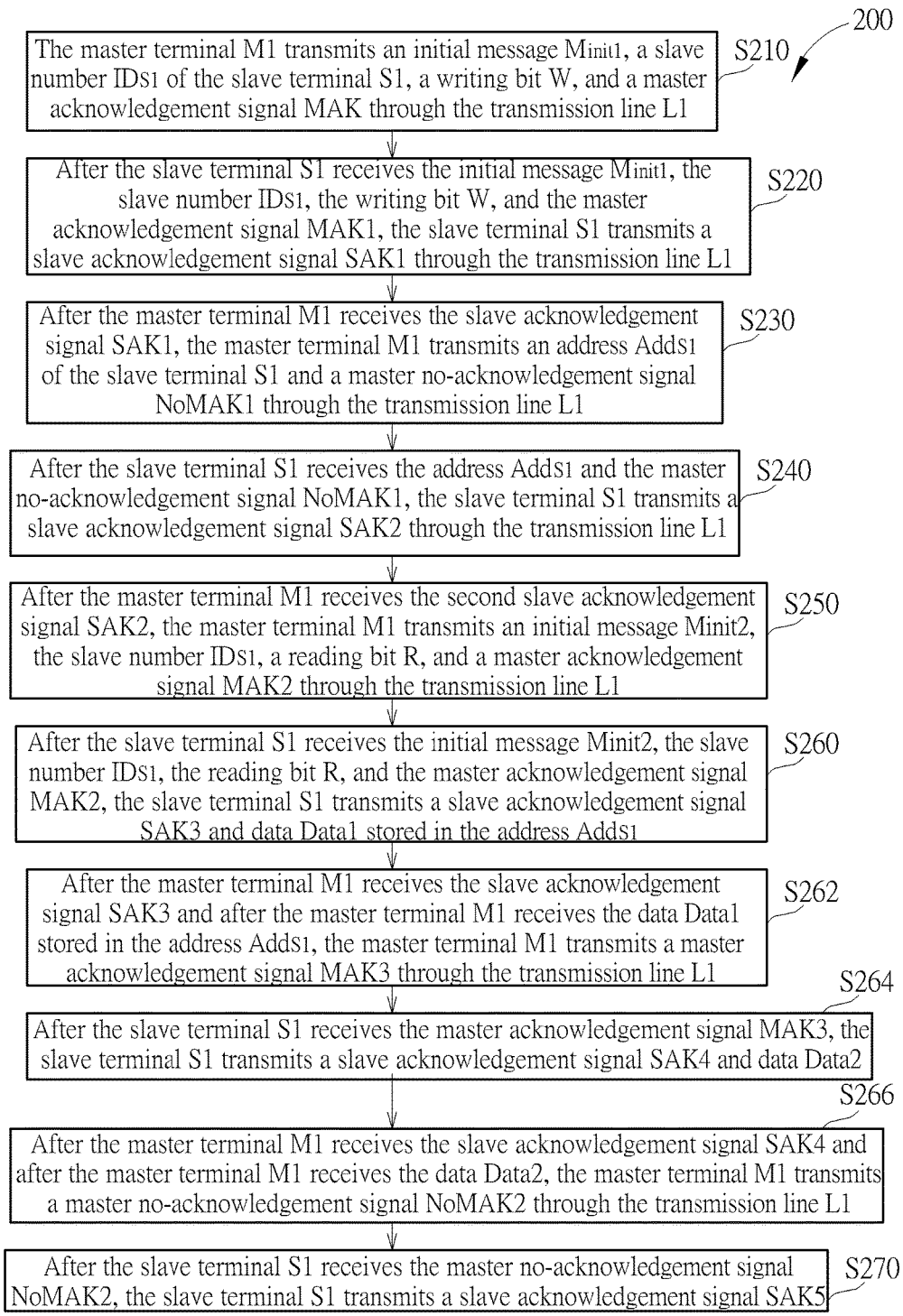
FIG. 7 shows a flow chart of a communication method according to another embodiment of the present invention.
Figure 8:
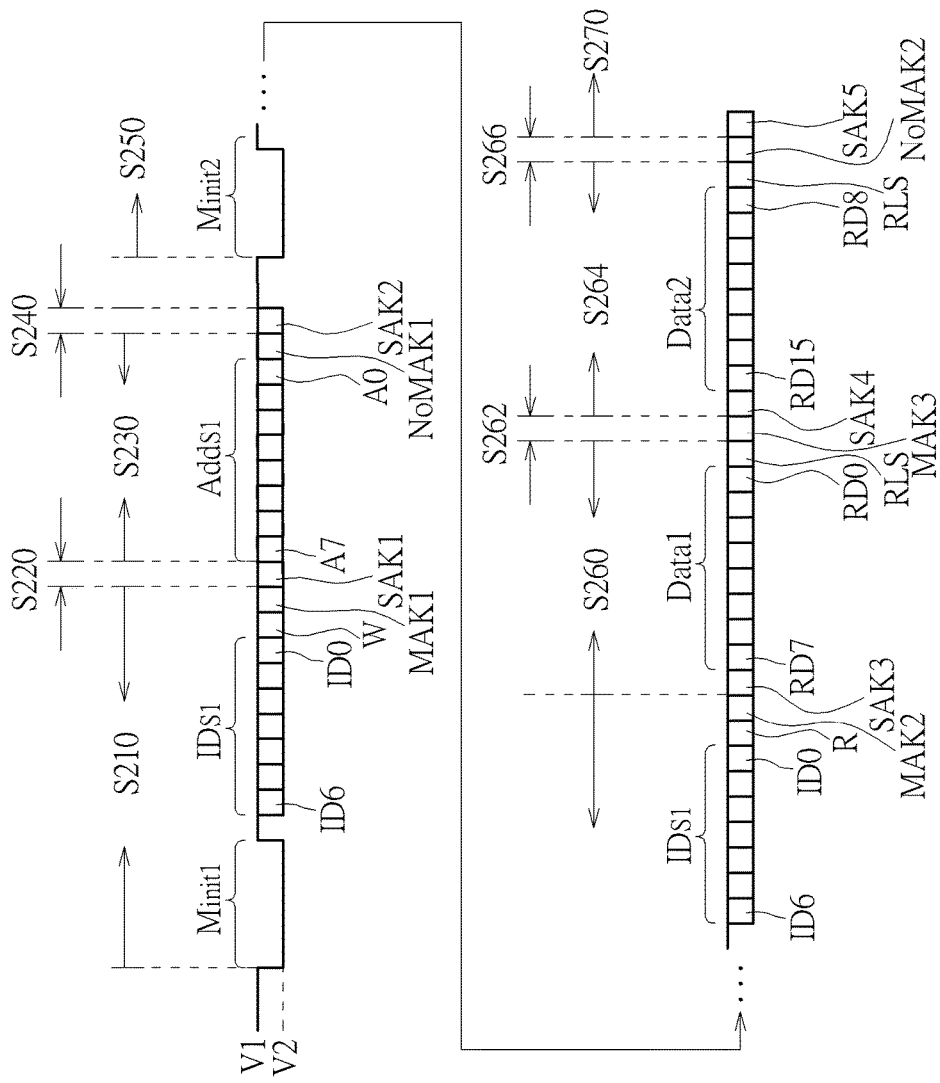
FIG. 8 shows a timing diagram of the method in FIG. 7.

FIG. 7 shows a flow chart of a bidirectional communication method 200 between the master terminal M1 and the slave terminal S1 according to one embodiment of the present invention. According to the method 200, the bidirectional communication system 10 can allow the master terminal M1 to perform read operations to the slave terminal S1 through the single transmission line L1. FIG. 8 shows a timing diagram of signals on the transmission line L1 according to the method 200, namely, FIG. 8 can help to explain the timing of the signals transmitted by the master terminal M1 or the slave terminal S1 on the transmission line L1 in each of the steps of method 200. In some embodiments of the present invention, when there is no element transmitting signals through the transmission line L1, the voltage level of the transmission line L1 will be back to the first voltage level V1. In some embodiments of the present invention, when the master terminal M1 and the slave terminal are not transmitting any signals on the transmission line L1, the voltage level of the transmission line L1 will be kept at a first voltage level V1.

Method 200 in FIG. 7 includes steps S210 to S270.

In step S210, the master terminal M1 can transmit an initial message $M_{init1}$, a slave number $ID_{S1}$ of the slave terminal S1, a writing bit W, and a master acknowledgement signal MAK through the transmission line L1. Step S210 is similar to step S110, but the master terminal M1 further transmits the writing bit W. After the master terminal M1 transmits the writing bit W and the slave number $ID_{S1}$, the master terminal M1 can transmit the master acknowledgement signal MAK1.

In step S220, after the slave terminal S1 that has the slave number $ID_{S1}$ receives the initial message $M_{init1}$, the slave number $ID_{S1}$, the writing bit W, and the master acknowledgement signal MAK1, the slave terminal S1 can transmit a slave acknowledgement signal SAK1 through the transmission line L1 to notify the master terminal M1 for further communication.

In some embodiments of the present invention, to make the method compatible with devices that use internal integrated circuit easier, in step S230, after the master terminal M1 receives the slave acknowledgement signal SAK1, the master terminal M1 can transmit an address $Add_{S1}$ of the slave terminal S1 and a master no-acknowledgement signal NoMAK1 through the transmission line L1.

In step S240, after the slave terminal S1 receives the address $Add_{S1}$ and the master no-acknowledgement signal NoMAK1, the slave terminal S1 can transmit a slave acknowledgement signal SAK2 through the transmission line L1. Therefore, the read operation can be separated into two stages so that the control logic of method 200 can be more compatible to the control logic using I²C.

In step S250, after the master terminal M1 receives the second slave acknowledgement signal SAK2, the master terminal M1 can transmit an initial message $M_{init2}$, the slave number $ID_{S1}$, a reading bit R, and a master acknowledgement signal MAK2 through the transmission line L1. The reading bit R can notify the slave terminal S1 of the coming read operation from the master terminal M1 so the slave terminal S1 can prepare for the correspondingly operations in the following steps. In some embodiments, the reading bit R and the writing bit W can be complementary to each other, that is, if the writing bit W is represented as 0, then the reading bit would be represented as 1.

In step S260, after the slave terminal S1 receives the initial message $M_{init2}$, the slave number $ID_{S1}$, the reading bit R, and the master acknowledgement signal MAK2, the slave terminal S1 can transmit a slave acknowledgement signal SAK3 and data Data1 stored in the address $Add_{S1}$. In some embodiments, the step S260 is similar to the step S150, namely, the slave terminal S1 can transmit each bit of the data Data1 with different orders, read the completed 16 bits of data RD15 to RD0 stored in the memory corresponding to the address $Add_{S1}$, or perform a burst read function.

In step S262, after the master terminal M1 receives the slave acknowledgement signal SAK3 and after the master terminal M1 receives the data Data1 stored in the address $Add_{S1}$, the master terminal M1 can transmit a master acknowledgement signal MAK3 through the transmission line L1.

In step S264, after the slave terminal S1 receives the master acknowledgement signal MAK3, the slave terminal S1 can transmit a slave acknowledgement signal SAK4 and data Data2.

In step S266, after the master terminal M1 receives the slave acknowledgement signal SAK4 and after the master terminal M1 receives the data Data2, the master terminal M1 can transmit a master no-acknowledgement signal NoMAK2 through the transmission line L1.

In step S270, after the slave terminal S1 receives the master no-acknowledgement signal NoMAK2, the slave terminal S1 can transmit a slave acknowledgement signal SAK5, and the read operating to the slave terminal S1 from the master terminal M1 is also completed.

In other embodiments, if the master terminal M1 only wants to read the data Data1 and does not want to read the data Data2, then the steps S264 and S266 can be skipped and the master terminal M1 can transmit the master no-acknowledgement signal NoMAK right after the master terminal M1 receives the data Data1 in step S262, instead of the master acknowledgement signal MAK3, so that the slave terminal S1 can be informed that the master terminal M1 is about to terminate the read operation to the slave terminal S1.

In some embodiments, after the slave terminal S1 transmits the data Data1 or Data2 through the transmission line L1, the slave terminal S1 can transmit the release signal RLS successively so that the master terminal M1 can identify whether the last bit of each data is 0 or 1.

In some embodiments, the method 200 can be similar to method 100, the master terminal M1 can either execute the interrupt instructions of the system or to go on to the next operation of the communication according to whether the slave acknowledgement signal transmitted by the slave terminal S1 is received within a predetermined time.

According to the method 200, the master terminal M1 can communicate with the slave terminal S1 on one single transmission line L1, and the transmission line L1 can be connected to the plurality of slave terminals S1, S2, and S3 so that the complexity of routing between elements and the requirement of number of pins for the master terminal M1 can both be reduced.

Figure 9:
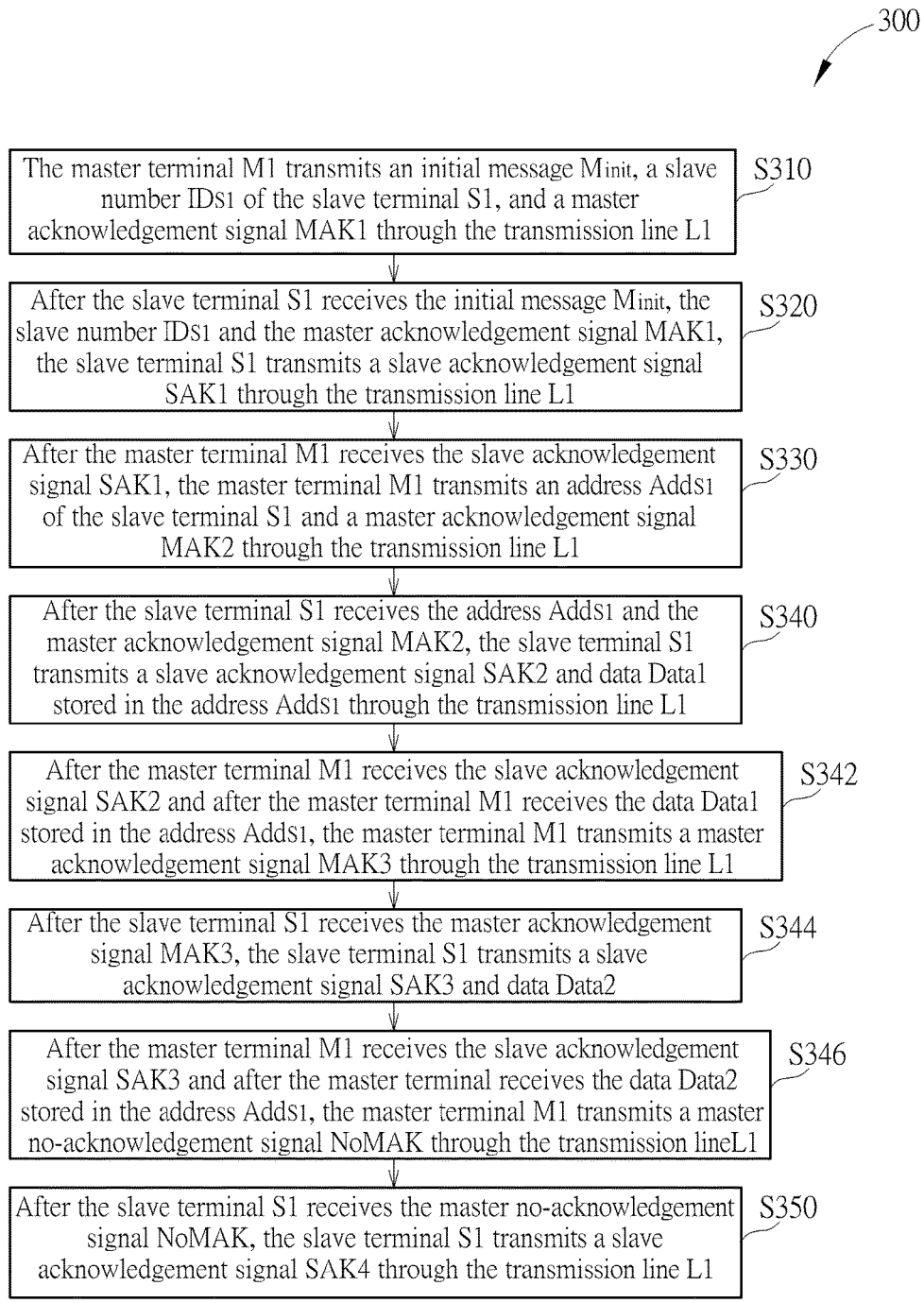
FIG. 9 shows a flow chart of a communication method according to another embodiment of the present invention.
Figure 10:
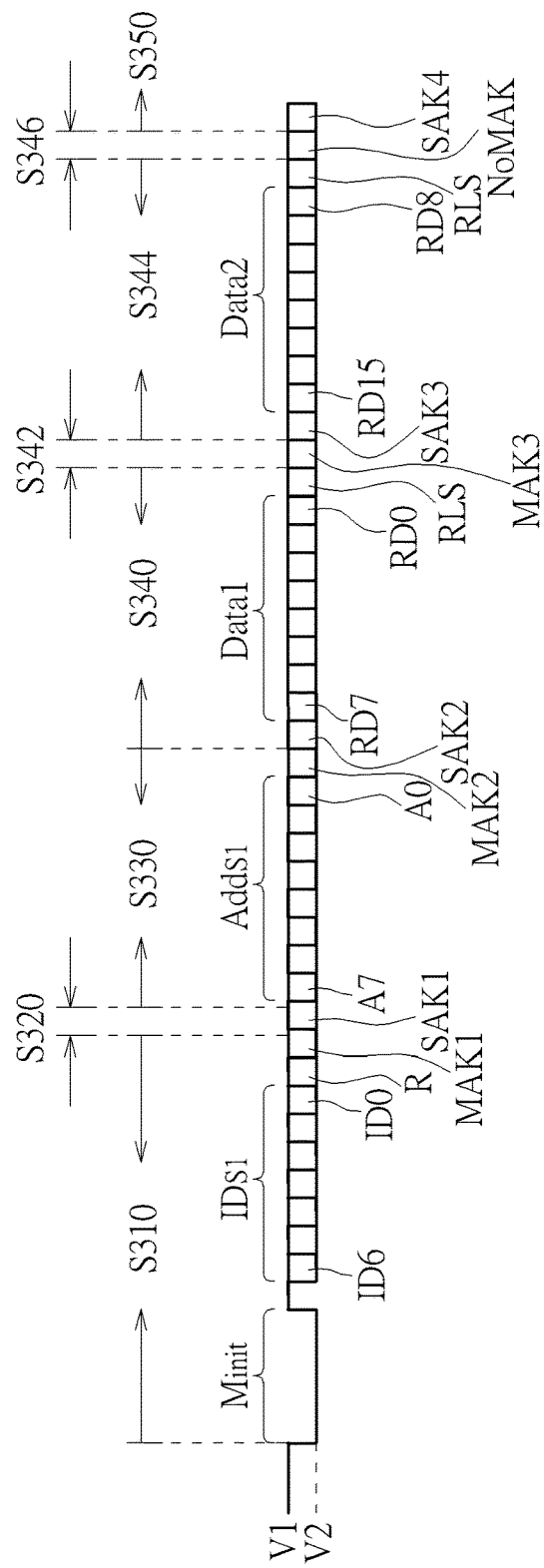
FIG. 10 shows a timing diagram of the method in FIG. 9.

FIG. 9 shows a flow chart of a bidirectional communication method 300 between the master terminal M1 and the slave terminal S1 according to one embodiment of the present invention. According to the method 300, the bidirectional communication system 10 can allow the master terminal M1 to perform a read operation to the slave terminal S1 through the single transmission line L1. FIG. 10 shows a timing diagram of signals on the transmission line L1 according to the method 300, namely, FIG. 10 can help to explain the timing of the signals transmitted by the master terminal M1 or the slave terminal S1 on the transmission line L1 in each of the steps of method 300. In some embodiments of the present invention, when there is no element transmitting signals through the transmission line L1, the voltage level of the transmission line L1 will go back to the first voltage level V1. In some embodiments of the present invention, when the master terminal M1 and the slave terminal are not transmitting any signals through the transmission line L1, the voltage level of the transmission line L1 will be kept at a first voltage level V1.

Method 300 in FIG. 9 includes steps S310 to S350.

Similar to step S110, in step S310, the master terminal M1 can transmit an initial message $M_{init}$, a slave number $ID_{S1}$ of the slave terminal S1, and a master acknowledgement signal MAK through the transmission line L1. In some embodiments, the master terminal M1 can further transmit a reading bit R, and the reading bit R can be, for example but not limited to, 1, so that the slave terminal S1 can be informed that the master terminal M1 is about to perform the read operation and the slave terminal S1 can prepare for the corresponding operations in the following steps. In some embodiments, the master terminal M1 can transmit the reading bit R and then transmit the slave number $ID_{S1}$ or the master terminal M1 can transmit the slave number $D_{S1}$ and then transmit the reading bit R. Successively, the master terminal M1 can transmit the master acknowledgement signal MAK1.

In step S320, after the slave terminal S1 receives the initial message $M_{init}$, the slave number $ID_{S1}$ and the master acknowledgement signal MAK1, the slave terminal S1 can transmit a slave acknowledgement signal SAK1 through the transmission line L1 to inform the master terminal M1 for further communication.

In step S330, after the master terminal M1 receives the slave acknowledgement signal SAK1, the master terminal M1 can transmit an address $Add_{S1}$ of the slave terminal S1 and a master acknowledgement signal MAK2 through the transmission line L1.

In step S340, after the slave terminal S1 receives the address $Add_{S1}$ and the master acknowledgement signal MAK2, the slave terminal S1 can transmit a slave acknowledgement signal SAK2 and data Data1 stored in the address $Add_{S1}$ through the transmission line L1. In some embodiments, step S340 can be similar to step S150, namely, the slave terminal S1 can transmit each bit of the data Data1 with different orders, read the completed 16 bits of data RD15 to RD0 stored in the memory corresponding to the address $Add_{S1}$, or perform a burst read function.

In step S342, after the master terminal M1 receives the slave acknowledgement signal SAK2 and after the master terminal M1 receives the data Data1 stored in the address $Add_{S1}$, the master terminal M1 can transmit a master acknowledgement signal MAK3 through the transmission line L1.

In step S344, after the slave terminal S1 receives the master acknowledgement signal MAK3, the slave terminal S1 can transmit a slave acknowledgement signal SAK3 and data Data2.

In Step S346, after the master terminal M1 receives the slave acknowledgement signal SAK3 and after the master terminal receives the data Data2 stored in the address $Add_{S1}$, the master terminal M1 can transmit a master no-acknowledgement signal NoMAK through the transmission line L1.

In step S350, after the slave terminal S1 receives the master no-acknowledgement signal NoMAK, the slave terminal S1 can transmit a slave acknowledgement signal SAK4 through the transmission line L1, and the read operation to the slave terminal S1 from the master terminal M1 is also completed.

In other embodiments, if the master terminal M1 only wants to read the data Data1 and does not want to read the data Data2, then steps S344 and S346 can be skipped, and the master terminal M1 can transmit the master no-acknowledgement signal NoMAK right after the master terminal M1 receives the data Data1 in step S342, instead of transmitting the master acknowledgement signal MAK3. Therefore, the slave terminal S1 can be informed that the master terminal M1 is about to terminate the read operation to the slave terminal S1.

In some embodiments, after the slave terminal S1 transmits the data Data1 or Data2 through the transmission line L1, the slave terminal S1 can transmit the release signal RLS successively so that the master terminal M1 can identify whether the last bit of each data is 0 or 1.

Also, in some embodiments, the master terminal M1 can decide whether to execute the interrupt instructions of the system or to go on to the next operation of the communication according to whether the slave acknowledgement signal transmitted by the slave terminal S1 is received within a predetermined time.

According to the method 300, the master terminal M1 can communicate with the slave terminal S1 on one single transmission line L1, and the transmission line L1 can be connected to the plurality of slave terminals S1, S2, and S3 so that the complexity of routing between elements and the requirement of number of pins for the master terminal M1 can both be reduced.

The method 100, 200, and 300 explain that the master terminal M1 can perform read operations or write operations to the slave terminal S1 through one single transmission line L1, however, in other embodiments of the present invention, the master terminal M1 can also perform other operations to the slave terminal S1 through the transmission line L1.

Figure 11:
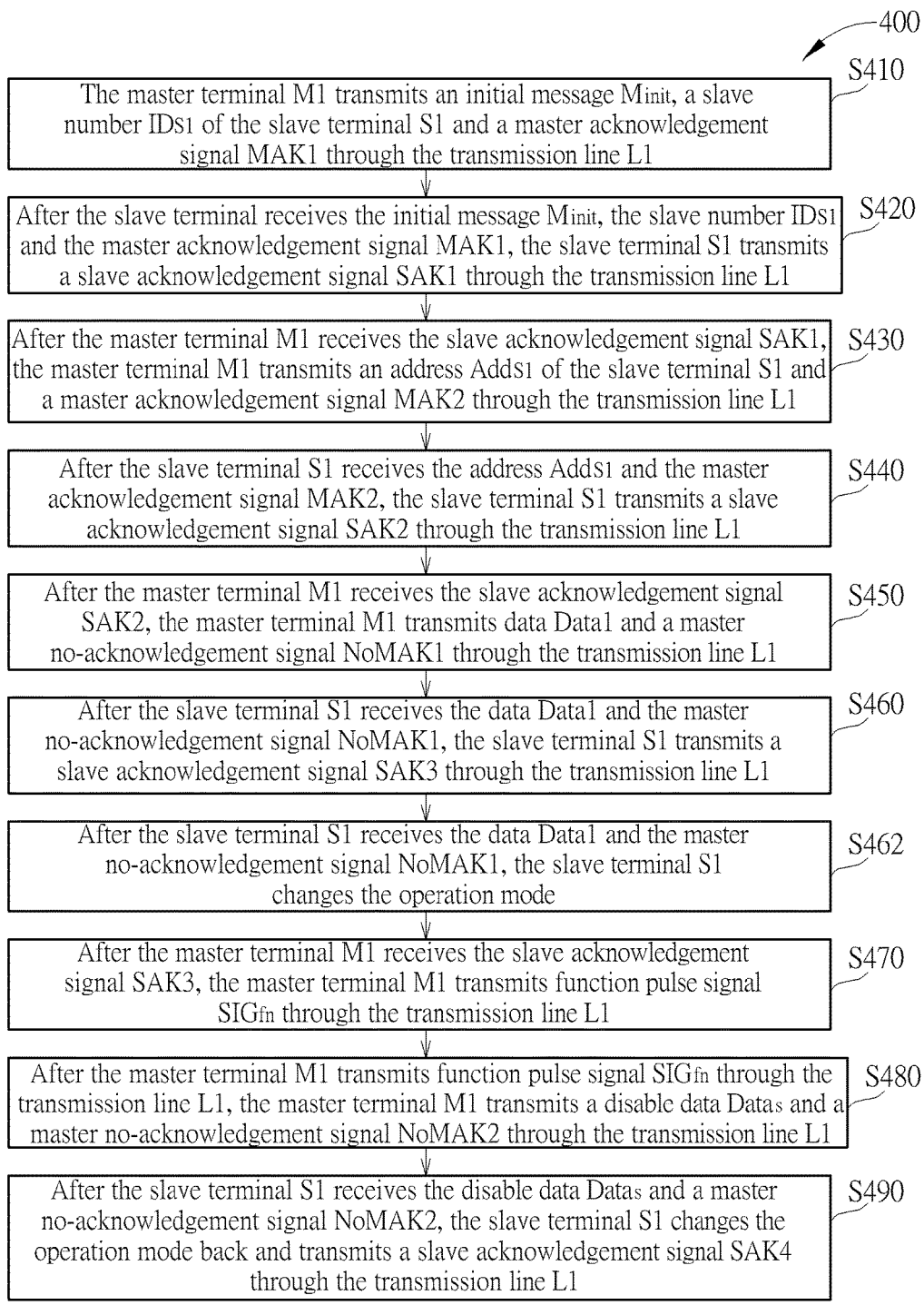
FIG. 11 shows a flow chart of a communication method according to another embodiment of the present invention.
Figure 12:
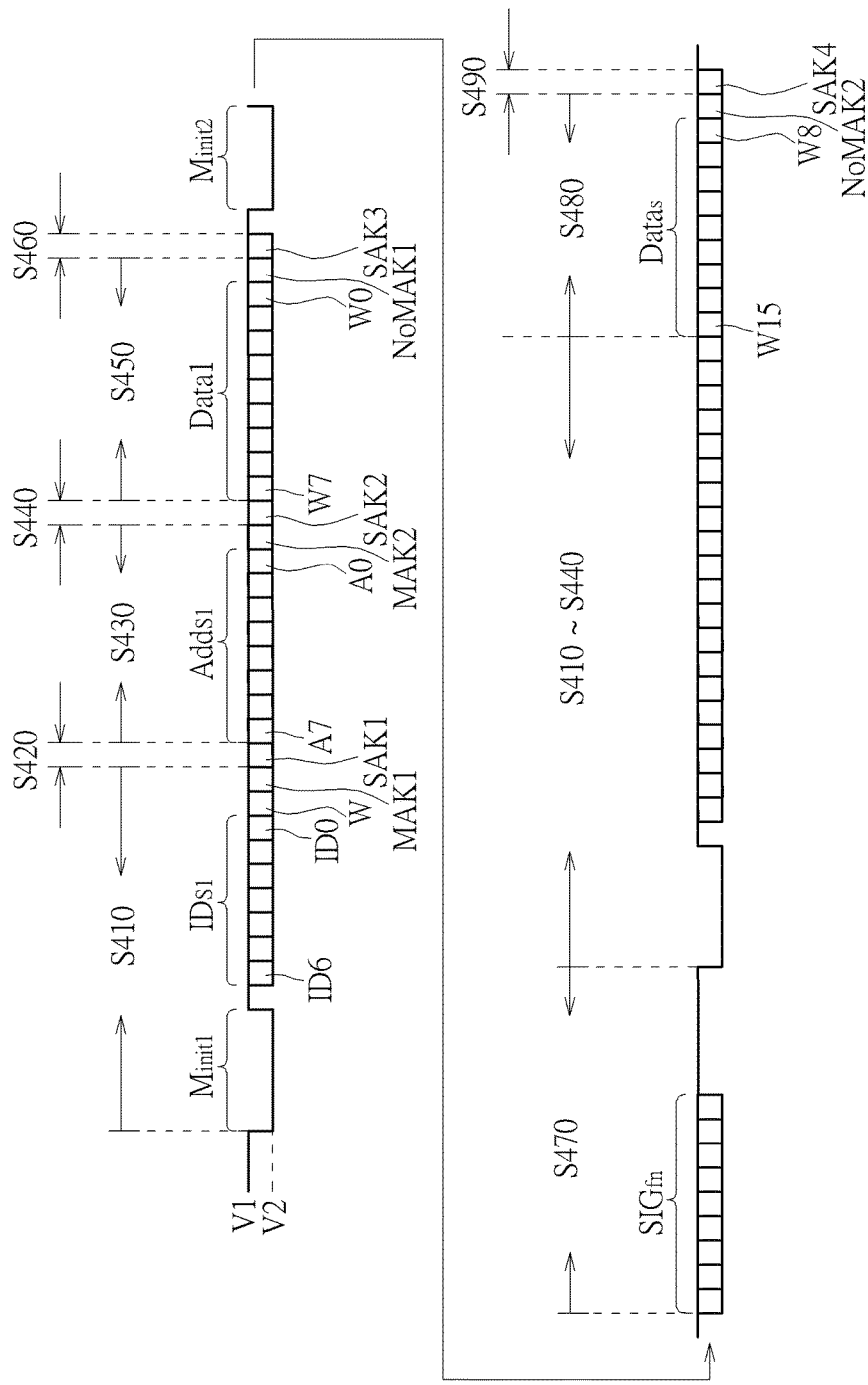
FIG. 12 shows a timing diagram of the method in FIG. 11.

FIG. 11 shows a flow chart of a bidirectional communication method 400 between the master terminal M1 and the slave terminal S1 according to one embodiment of the present invention. According to the method 400, the bidirectional communication system 10 can allow the master terminal M1 to perform other operations, such as clock calibration or supplementary operations, to the slave terminal S1 through the single transmission line L1. FIG. 12 shows a timing diagram of signals on the transmission line L1 according to the method 400, namely, FIG. 12 can help to explain the timing of the signals transmitted by the master terminal M1 or the slave terminal S1 on the transmission line L1 in each of the steps of method 400. In some embodiments of the present invention, when there is no element transmitting signals through the transmission line L1, the voltage level of the transmission line L1 will go back to the first voltage level V1. In some embodiments of the present invention, when the master terminal M1 and the slave terminal are not transmitting any signals through the transmission line L1, the voltage level of the transmission line L1 will be kept at a first voltage level V1.

The method in FIG. 11 includes steps S410 to S490. The steps S410 to S440 in the method 400 are similar to the steps S110 to S140 in the method 100, however, the address $Add_{S1}$ of the slave terminal S1 transmitted by the master terminal M1 in step S430 is corresponding to a special function of the slave terminal S1.

In step S450, the master terminal M1 can transmit data Data1 to the address $Add_{S1}$ to enable the special function of the slave terminal S1. Also, the master terminal M1 can transmit a master no-acknowledgement signal NoMAK1 through the transmission line L1 right after the master terminal M1 transmits the data Data1. When the address $Add_{S1}$ corresponding to the special function of the slave terminal S1 is written with data Data1, it means that the master terminal M1 wants the slave terminal S1 to perform the special function instead of read-or-write operation. In some embodiments of the present invention, the eight bits of information W7 to W0 of the data Data1 can individually be corresponding to specific information so the slave terminal S1 can confirm the instruction coming from the master terminal M1.

In step S460, after the slave terminal S1 receives the data Data1 and the master no-acknowledgement signal NoMAK1, the slave terminal S1 can transmit a slave acknowledgement signal SAK3. Also, in the step S462, the slave S1 can change from being operated under a first mode to being operated under a second mode. The first mode can be, for example, the read-or-write mode, in which the master terminal M1 can perform read or write operations to the slave terminal S1 by methods such as method 100, 200, and 300. The second mode can be a mode different from the first mode. For example, when the slave terminal S1 is operated in the second mode, the master terminal M1 can request the slave terminal S1 to perform a clock calibration or a slave supplementary function.

In step S470, after the master terminal M1 receives the slave acknowledgement signal SAK3, the master terminal M1 can transmit a function pulse signal $SIG_{fn}$ through the transmission line L1.

After the master terminal M1 finishes transmitting the function pulse signal $SIG_{fn}$, if the master terminal M1 wants the slave terminal S1 to stop being operated under the second mode, the master terminal M1 can further write a disable data $Data_s$ to the address $Add_{S1}$ of the slave terminal S1 for notifying the slave terminal S1 to stop being operated under the second mode. That is, the master terminal M1 can execute the initial steps of the write operations firstly, such as steps S40 to S440 shown in FIG. 12, and can transmit the disable data $Data_s$ and the master no-acknowledgement signal NoMAK2 in step S480 after the second time of execution of the steps S410 to S440, meaning that the master terminal M1 wants the slave terminal S1 to stop being operated under the second mode. In some embodiments of the present invention, the eight bit information W15 to W8 of the data $Data_s$ can individually be corresponding to specific information so the slave terminal S1 can confirm if the master terminal M1 wants the slave terminal S1 to stop being operated under the second mode.

In step S490, after the slave terminal S1 receives the disable data $Data_s$ and the master no-acknowledgement signal NoMAK2, the slave terminal S1 can change back to be operated under the original mode, that is, the slave terminal S1 can change from being operated under the second mode back to being operated under the first mode, and can transmit a slave acknowledgement signal SAK4 through the transmission line L1.

In some embodiments of the present invention, in the step S462, the slave terminal S1 can change from being operated under the first mode, such as the read-or-write mode, to being operated under the second mode, such as the clock calibration mode. In this case, the function pulse signal $SIG_{fn}$ can include a plurality of calibration pulses, and a ratio of a time each of the calibration pulses sustains in the second voltage level V2 to a time each of the calibration pulses sustains in the first voltage level V1 is between the upper threshold $R_{max}$ and the lower threshold $R_{min}$. In a better embodiment, the time each of the calibration pulses sustains in the second voltage level V2 is substantially equal to the time each of the calibration pulses sustains in the first voltage level V1, and the slave terminal S1 can calibrate a clock signal of the slave terminal according to the function pulse signal $SIG_{fn}$.

To ensure that the calibration of the slave terminal S1 is completed, after the master terminal M1 transmits the function pulse signal $SIG_{fn}$ through the transmission line L1, the master terminal M1 can further read clock calibration data stored in the slave terminal S1 through the transmission line L1 with methods similar to the method 200 or 300. The clock calibration data can include the setting information stored after the slave terminal S1 calibrate the clock signal so that users can confirm if the clock calibration of the slave terminal S1 is completed according to the clock calibration data. Consequently, the slave terminal S1 can calibrate the clock signal according to the function pulse signal $SIG_{fn}$ transmitted from the master terminal M1 without external circuits or extra memory, and the complexity of routing between elements and the requirement of number of pins for the master terminal M1 can both be reduced.

In other embodiments of the present invention, the slave terminal S1 can also change from being operated under the first mode, such as the read-or-write mode, to being operated under the second mode, such as the slave supplementary mode. In this case, the slave terminal S1 can control an output unit S1A of the slave terminal S1 according to the function pulse signal $SIG_{fn}$. For example, the output unit S1A can be a light source of light emitting diodes, and the function pulse signal $SIG_{fn}$ can be a pulse width modulation (PWM) signal including a plurality of pulses. Consequently, the slave terminal S1 can control the luminance of the light source of light emitting diodes according to the duty cycle of each of the pulses of the pulse width modulation signal. That is, the master terminal M1 can control the light source of light emitting diodes of the slave terminal S1 through the transmission line L1.

In addition, since the steps S410 to S460 can be seen as write operations of the master terminal M1 to the slave terminal S1, after the slave terminal S1 transmits the slave acknowledgement signal SAK3 in step S460 in FIG. 11, the master terminal M1 can further transmit an initial message $M_{initia2}$ before entering the step S470 to transmit the function pulse signal $SIG_{fn}$ so that the original timing of writing operations can be preserved and the misoperations of plurality of slave terminals S1, S2 and S3 on the transmission line L1 can be avoided.

Generally, the bidirectional communication system 10 may reserve the slave numbers of all bit 0 and all bit 1 for special purposes and may not claim any slave terminals with such kind of slave numbers. Therefore, in some embodiments of the present invention, a ratio of a time each of the pulses of the pulse width modulation signal sustains in the second voltage level V2 to a time each of the pulses sustains in the first voltage level V1 can be greater than the upper threshold $R_{max}$ or smaller than the lower threshold $R_{min}$. Consequently, in the function pulse signal $SIG_{fn}$, all the pulses of the pulse width modulation signal will be identified as bit 0 or all the pulses of the pulse width modulation signal will be identified as bit 1 so the other slave terminal S2 and S3 will not be triggered by the function pulse signal $SIG_{fn}$, and only the slave terminal S1 which enters the second mode will execute the corresponding function according to the function pulse signal $SIG_{fn}$.

According to the method 400, the master terminal M1 can communicate with the slave terminal S1 on one single transmission line L1, and the transmission line L1 can be connected to the plurality of slave terminals S1, S2, and S3 so that the complexity of routing between elements and the requirement of number of pins for the master terminal M1 can both be reduced.

In summary, according to method 100, 200, 300, or 400 the master terminal M1 can communicate with the slave terminal S1 on one single transmission line L1, and the transmission line L1 can be connected to the plurality of slave terminals S1, S2, and S3 so that the complexity of routing between elements and the requirement of number of pins for the master terminal M1 can both be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bidirectional communication method between a master terminal and a slave terminal on a transmission line, the method comprising: the master terminal transmitting an initial message, a slave number of the slave terminal and a first master acknowledgement signal through the transmission line;
after the slave terminal receives the initial message, the slave number and the first master acknowledgement signal, the slave terminal being operated under a first mode and transmitting a first slave acknowledgement signal through the transmission line;
after the master terminal receives the first slave acknowledgement signal, the master terminal transmitting an address of the slave terminal and a second master acknowledgement signal through the transmission line;
after the slave terminal receives the address and the second master acknowledgement signal, the slave terminal transmitting a second slave acknowledgement signal through the transmission line; after the master terminal receives the second slave acknowledgement signal, the master terminal transmitting data and a first master no-acknowledgement signal through the transmission line; and
after the slave terminal receives the data and the first master no-acknowledgement signal, the slave terminal transmitting a third slave acknowledgement signal through the transmission line; wherein: each of the master acknowledgement signals is changing from a first voltage level to a second voltage level and then changing from the second voltage level to the first voltage level, and the first master no-acknowledgement signal is changing from the first voltage level to the second voltage level and then changing from the second voltage level to the first voltage level; a first ratio of a time each of the master acknowledgement signals sustains in the second voltage level to a time each of the master acknowledgement signals sustains in the first voltage level is greater than an upper threshold and a second ratio of a time the first master no-acknowledgement signal sustains in the second voltage level to a time the first master no-acknowledgement signal sustains in the first voltage level is smaller than a lower threshold, or the first ratio is smaller than the lower threshold and the second ratio is greater than the upper threshold;

and the upper threshold is greater than or equal to the lower threshold.

2. The method of claim 1, wherein the master terminal transmitting the initial message, the slave number of the slave terminal and the first master acknowledgement signal through the transmission line further comprises: before the master terminal transmits the first master acknowledgement signal through the transmission line, the master terminal transmitting a writing bit through the transmission line.

3. The method of claim 1, wherein:

after the master terminal receives the first slave acknowledgement signal, the master terminal transmitting the address of the slave terminal and the second master acknowledgement signal is after the master terminal receives the first slave acknowledgement signal within a first predetermined time, the master terminal transmitting the address of the slave terminal and the second master acknowledgement signal; and after the master terminal receives the second slave acknowledgement signal, the master terminal transmitting the data and the first master no-acknowledgement signal through the transmission line is after the master terminal receives the second slave acknowledgement signal within a second predetermined time, the master terminal transmitting the data and the first master no-acknowledgement signal through the transmission line.

4. The method of claim 3, further comprising:

when the master terminal does not receive the first slave acknowledgement signal within the first predetermined time or does not receive the second slave acknowledgement signal within the second predetermined time, the master terminal executing an interrupt instruction.

5. The method of claim 1, further comprising:

after the slave terminal receives the data and the first master no-acknowledgement signal, the slave terminal changing from being operated in the first mode to being operated in a second mode; and after the master terminal receives the third slave acknowledgement signal, the master terminal transmitting a function pulse signal through the transmission line;

wherein: when the master terminal or the slave terminal transmits a first type bit data through the transmission line, the master terminal or the slave terminal changes a voltage level of the transmission line from the first voltage level to the second voltage level and then changes the voltage level of the transmission line from the second voltage level to the first voltage level within a transmission time of the first type bit data, and a ratio of a time the voltage level of the transmission line sustains in the second voltage level to a time the voltage level of the transmission line sustains in the first voltage level is smaller than the lower threshold;

and when the master terminal or the slave terminal transmits a second type bit data through the transmission line, the master terminal or the slave terminal changes the voltage level of the transmission line from the first voltage level to the second voltage level and then changes the voltage level of the transmission line from the second voltage level to the first voltage level within a transmission time of the second type bit data, and a ratio of a time the voltage level of the transmission line sustains in the second voltage level to a time the voltage level of the transmission line sustains in the first voltage level is greater than the upper threshold.

6. The method of claim 5, wherein the first mode is a read mode or a write mode, the second mode is a clock calibration mode, and the method further comprises:

the slave terminal calibrating a clock signal of the slave terminal according to the function pulse signal.

7. The method of claim 6, wherein:

the function pulse signal includes a plurality of calibration pulses, and a time each of the calibration pulses sustains in the second voltage level is substantially equal to a time each of the calibration pulses sustains in the first voltage level.

8. The method of claim 6, wherein:

the function pulse signal includes a plurality of calibration pulses, and a ratio of a time each of the calibration pulses sustains in the second voltage level to a time each of the calibration pulses sustains in the first voltage level is between the upper threshold and the lower threshold.

9. The method of claim 6, further comprising:

after the master terminal transmits the function pulse signal through the transmission line, the master terminal reading clock calibration data stored in the slave terminal through the transmission line to confirm if the clock calibration of the slave terminal is completed.

10. The method of claim 5, wherein the second mode is a slave supplementary mode, and the method further comprises: the slave terminal controlling an output unit according to the function pulse signal.

11. The method of claim 10, wherein the output unit is a light source of light emitting diodes, and the function pulse signal is a pulse width modulation signal including a plurality of pulses.

12. The method of claim 11, wherein a ratio of a time each of the pulses of the pulse width modulation signal sustains in the second voltage level to a time each of the pulses sustains in the first voltage level is greater than the upper threshold or smaller than the lower threshold.

13. The method of claim 5, further comprising:

after the master terminal receives the third slave acknowledgement signal and before the master terminal transmits the function pulse signal through the transmission line, the master terminal transmitting a second initial message through the transmission line.

14. The method of claim 5, further comprising:

after the master terminal transmits the function pulse signal through the transmission line, the master terminal transmitting a disable data and a second master no-acknowledgement signal through the transmission line; and after the slave terminal receives the disable data and the second master no-acknowledgement signal, the slave terminal changing from being operated under the second mode to being operated under the first mode and transmitting a fourth slave acknowledgement signal through the transmission line.

15. The method of claim 5, wherein the upper threshold is 2 and the lower threshold is 0.5.

16. The method of claim 5, wherein the first type bit data is 1 and the second type bit data is 0, or the first type bit data is 0 and the second type bit data is 1.

17. The method of claim 1, further comprising:

after the master terminal transmits each of the master acknowledge signals through the transmission line, the master terminal transmitting a release signal through the transmission line successively;

and after the master terminal transmits the first master no-acknowledge signal through the transmission line, the master terminal transmitting the release signal through the transmission line successively; wherein the release signal is changing from the first voltage level to the second voltage level and then changing from the second voltage level to the first voltage level.

18. The method of claim 1, wherein each of the slave acknowledgement signals is changing from the first voltage level to the second voltage level and then changing from the second voltage level to the first voltage level.

19. A bidirectional communication method between a master terminal and a slave terminal on a transmission line, the method comprising: the master terminal transmitting a first initial message, a slave number of the slave terminal, a writing bit, and a first master acknowledgement signal through the transmission line;
after the slave terminal receives the first initial message, the slave number, the writing bit and the first master acknowledgement signal, the slave terminal transmitting a first slave acknowledgement signal through the transmission line;
after the master terminal receives the first slave acknowledgement signal, the master terminal transmitting an address of the slave terminal and a first master no-acknowledgement signal through the transmission line;
after the slave terminal receives the address and the first master no-acknowledgement signal, the slave terminal transmitting a second slave acknowledgement signal through the transmission line;
after the master terminal receives the second slave acknowledgement signal, the master terminal transmitting a second initial message, the slave number, a reading bit, and a second master acknowledgement signal through the transmission line;
after the slave terminal receives the second initial message, the slave number, the reading bit, and the second master acknowledgement signal, the slave terminal transmitting a third slave acknowledgement signal and data stored in the address;
after the master terminal receives the third slave acknowledgement signal and after the master terminal receives the data stored in the address, the master terminal transmitting a second master no-acknowledgement signal through the transmission line; and
after the slave terminal receives the second master no-acknowledgement signal, the slave terminal transmitting a fourth slave acknowledgement signal;
wherein: each of the master acknowledgement signals is changing from a first voltage level to a second voltage level and then changing from the second voltage level to the first voltage level, and each of the master no-acknowledgement signals is changing from the first voltage level to the second voltage level and then changing from the second voltage level to the first voltage level;
a first ratio of a time each of the master acknowledgement signals sustains in the second voltage level to a time each of the master acknowledgement signals sustains in the first voltage level is greater than an upper threshold and a second ratio of a time each of the master no-acknowledgement signals sustains in the second voltage level to a time each of the master no-acknowledgement signals sustains in the first voltage level is smaller than a lower threshold, or the first ratio is smaller than the lower threshold and the second ratio is greater than the upper threshold;
and the upper threshold is greater than or equal to the lower threshold.

20. The method of claim 19, wherein the first initial message is changing from the first voltage level to the second voltage level and then changing from the second voltage level to the first voltage level, and a time the first initial message sustains in the second voltage level is longer than a transmission time of one bit data.

21. The method of claim 19, wherein after the slave terminal receives the second master acknowledgement signal, the slave terminal transmitting the third slave acknowledgement signal and the data stored in the address further comprises after the slave terminal transmits the third slave acknowledgement signal and the data stored in the address, the slave terminal transmitting a release signal through the transmission line, wherein the release signal is changing from the first voltage level to the second voltage level and then changing from the second voltage level to the first voltage level.

22. The method of claim 19, wherein: after the master terminal receives the first slave acknowledgement signal, the master terminal transmitting the address of the slave terminal and the first master no-acknowledgement signal is after the master terminal receives the first slave acknowledgement signal within a first predetermined time, the master terminal transmitting the address of the slave terminal and the first master no-acknowledgement signal;
after the master terminal receives the second slave acknowledgement signal, the master terminal transmitting the second initial message, the slave number, the reading bit and the second master acknowledgement signal through the transmission line is after the master terminal receives the second slave acknowledgement signal within a second predetermined time, the master terminal transmitting the second initial message, the slave number, the reading bit and the second master acknowledgement signal through the transmission line; and
after the master terminal receives the third slave acknowledgement signal and after the master terminal receives the data stored in the address, the master terminal transmitting the second master no-acknowledgement signal through the transmission line is after the master terminal receives the third slave acknowledgement signal within a third predetermined time and after the master terminal receives the data stored in the address, the master terminal transmitting the second master no-acknowledgement signal through the transmission line.

23. The method of claim 22, further comprising:
when the master terminal does not receive the first slave acknowledgement signal within the first predetermined time, does not receive the second slave acknowledgement signal within the second predetermined time, or does not receive the third slave acknowledgement signal within the third predetermined time, the master terminal executing an interrupt instruction.

24. The method of claim 19, wherein the reading bit and the writing bit are complemented to each other.

25. The method of claim 19, wherein: when the master terminal or the slave terminal transmits a first type bit data through the transmission line, the master terminal or the slave terminal changes a voltage level of the transmission line from the first voltage level to the second voltage level and then changes the voltage level of the transmission line from the second voltage level to the first voltage level within a transmission time of the first type bit data, and a ratio of a time the voltage level of the transmission line sustains in the second voltage level to a time the voltage level of the transmission line sustains in the first voltage level is smaller than the lower threshold;

and when the master terminal or the slave terminal transmits a second type bit data through the transmission line, the master terminal or the slave terminal changes the voltage level of the transmission line from the first voltage level to the second voltage level and then changes the voltage level of the transmission line from the second voltage level to the first voltage level within a transmission time of the second type bit data, and a ratio of a time the voltage level of the transmission line sustains in the second voltage level to a time the voltage level of the transmission line sustains in the first voltage level is greater than the upper threshold.

26. A bidirectional communication method between a master terminal and a slave terminal on a transmission line, the method comprising: the master terminal transmitting an initial message, a slave number of the slave terminal, and a first master acknowledgement signal through the transmission line;

after the slave terminal receives the initial message, the slave number and the first master acknowledgement signal, the slave terminal transmitting a first slave acknowledgement signal through the transmission line; after the master terminal receives the first slave acknowledgement signal, the master terminal transmitting an address of the slave terminal and a second master acknowledgement signal through the transmission line; after the slave terminal receives the address and the second master acknowledgement signal, the slave terminal transmitting a second slave acknowledgement signal and data stored in the address through the transmission line;

after the master terminal receives the second slave acknowledgement signal and after the master terminal receives the data stored in the address, the master terminal transmitting a master no-acknowledgement signal through the transmission line; and after the slave terminal receives the master no-acknowledgement signal, the slave terminal transmitting a third slave acknowledgement signal through the transmission line;

wherein: each of the master acknowledgement signals is changing from a first voltage level to a second voltage level and then changing from the second voltage level to the first voltage level, and the master no-acknowledgement signal is changing from the first voltage level to the second voltage level and then changing from the second voltage level to the first voltage level;

a first ratio of a time each of the master acknowledgement signals sustains in the second voltage level to a time each of the master acknowledgement signals sustains in the first voltage level is greater than an upper threshold and a second ratio of a time the master no-acknowledgement signal sustains in the second voltage level to a time the master no-acknowledgement signal sustains in the first voltage level is smaller than a lower threshold, or the first ratio is smaller than the lower threshold and the second ratio is greater than the upper threshold; and the upper threshold is greater than or equal to the lower threshold.

27. The method of claim 26, wherein after the slave terminal receives the address and the second master acknowledgement signal, the slave terminal transmitting the second slave acknowledgement signal and the data stored in the address further comprises after the slave terminal transmitting the second slave acknowledgement signal and the data stored in the address, the slave terminal transmitting a release signal through the transmission line, wherein the release signal is changing from the first voltage level to the second voltage level and then changing from the second voltage level to the first voltage level.

28. The method of claim 26, wherein the master terminal transmitting the initial message, the slave number of the slave terminal and the first master acknowledgement signal through the transmission line further comprises: before the master terminal transmits the first master acknowledgement signal through the transmission line, the master terminal transmitting a reading bit through the transmission line.

29. The method of claim 26, wherein: after the master terminal receives the first slave acknowledgement signal, the master terminal transmitting the address of the slave terminal and the second master acknowledgement signal is after the master terminal receives the first slave acknowledgement signal within a first predetermined time, the master terminal transmitting the address of the slave terminal and the second master acknowledgement signal; and after the master terminal receives the second slave acknowledgement signal and after the master terminal receives the data stored in the address, the master terminal transmitting the master no-acknowledgement signal through the transmission line is after the master terminal receives the second slave acknowledgement signal within a second predetermined time and after the master terminal receives the data stored in the address, the master terminal transmitting the master no-acknowledgement signal through the transmission line.

30. The method of claim 29, further comprising: when the master terminal does not receive the first slave acknowledgement signal within the first predetermined time or does not receive the second slave acknowledgement signal within the second predetermined time, the master terminal executing an interrupt instruction.

31. The method of claim 26, wherein: when the master terminal or the slave terminal transmits a first type bit data through the transmission line, the master terminal or the slave terminal changes a voltage level of the transmission line from the first voltage level to the second voltage level and then changes the voltage level of the transmission line from the second voltage level to the first voltage level within a transmission time of the first type bit data, and a ratio of a time the voltage level of the transmission line sustains in the second voltage level to a time the voltage level of the transmission line sustains in the first voltage level is smaller than the lower threshold;

and when the master terminal or the slave terminal transmits a second type bit data through the transmission line, the master terminal or the slave terminal changes the voltage level of the transmission line from the first voltage level to the second voltage level and then changes the voltage level of the transmission line from the second voltage level to the first voltage level within a transmission time of the second type bit data, and a ratio of a time the voltage level of the transmission line sustains in the second voltage level to a time the voltage level of the transmission line sustains in the first voltage level is greater than the upper threshold.

* * * * *